INVENTORS
SVEN GUSTAV INGEMAR KILANDER
BERT OLOF TORSTEN ANDERSSON
BY
Hane and Nydick
ATTORNEYS INVENTORS
SVEN GUSTAV INGEMAR KILANDER
BERT OLOF TORSTEN ANDERSSON
BY Hane and Nydick
ATTORNEYS INVENTORS
SVEN GUSTAV INGEMAR KILANDER
BERT OLOF TORSTEN ANDERSSON
BY
Hane and Nydick
ATTORNEYS INVENTORS
SVEN GUSTAV INGEMAR KILANDER
BERT OLOF TORSTEN ANDERSSON
BY Hane and Nydick
ATTORNEYS 3,376,394

PBX HAVING MULTIWIRE SIGNAL CHANNEL MEANS BETWEEN OPERATOR AND TRUNK EQUIPMENT

Sven Gustav Ingemar Kilander, Stuvsta, and Bert Olof Torsten Andersson, Bandhagen, Sweden, assignors to Telefonaktiebolaget L M Ericsson, Stockholm, Sweden, a corporation of Sweden Filed Apr. 9, 1965, Ser. No. 446,931
Claims priority, application Sweden, Apr. 17, 1964, 4,729/64
4 Claims. (Cl. 179—27)

The present invention relates to automatic PBX-exchangse with trunk lines and at least one manual operator's position. The invention has for a purpose to provide a circuit arrangement for transmitting signals between the line equipment of a trunk line and the switch board of a telephone operator and comprises a selecting means for connection of at least two talking wires between said line equipment and said operator's set.

In modern PBX-exchanges a large quantity of different connecting cases are found and a great number of signals are required to keep a telephone operator informed about the condition in a telephone connection which she has to supervise and establish. The selectors that are needed to connect with known means the line equipment of a trunk line with the operator's position and supply necessary signals, must connect several wires and become therefore expensive and get small selection capacity and for that reason they will also be many in number.

The purpose of the present invention is to reduce these costs. This is achieved by means of a multiwire signal channel and by means of a relay chain which comprises a relay means for each trunk line equipment and a relay means for each operator's position and in which only one relay means at a time can be operated, and contacts that are actuated by means of said relay means and connect the wires of the signal channel to a signal sending means in the equipment corresponding to the operated relay means, a connecting relay in each line equipment and a connecting relay in each operator's position, provided with contacts which connect the wires of the signal channel to a signal receiving means belonging to respective equipment, and thereby that said connecting relay in one of the two equipments connected together by means of the selecting means is energized in a circuit through one of the wires of the selecting means when the relay means of the other equipment is operated and occupies the signal channel.

The invention will be described below by means of enclosed drawings, FIGS. 1–4.

Figure 1:
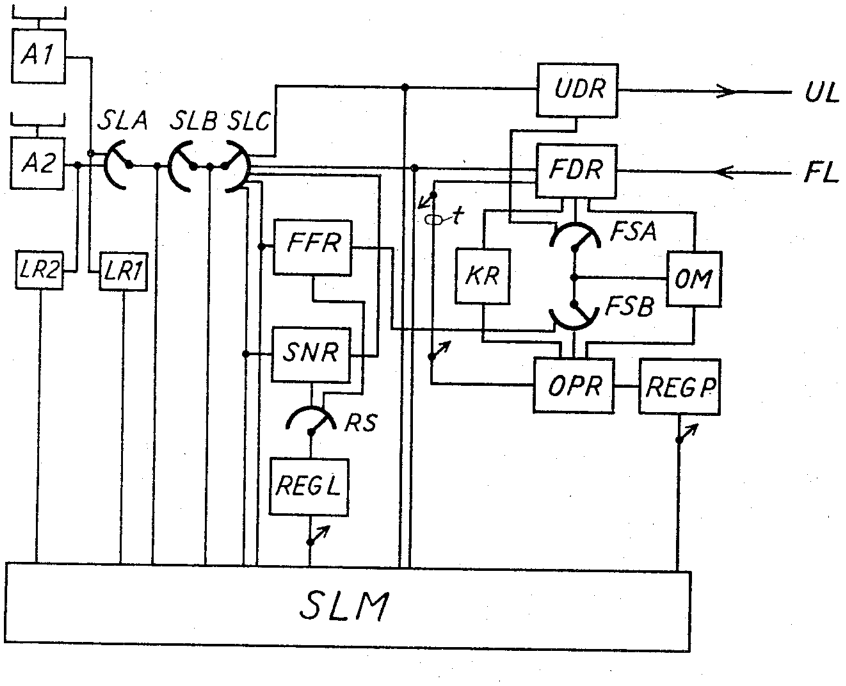
FIG. 1 shows a block diagram of an automatic PBX-exchange according to the invention.

In FIG. 1 are A1 and A2 subscriber telephones, LR1 and LR2 subscriber line equipments, SLA, SLB and SLC selector stages and SNR connecting circuits for local calls. REGL is a register and SLM a marker for setting of the selectors SLA, SLB, SLC, and RS is a selector for connection of the connecting circuits SNR to the registers REGL. For the traffic outgoing from the exchange there are provided trunk lines UL with line equipments UDR and for the incoming traffic there are found trunk lines FL with line equipments FDR. The outgoing traffic is fully automatic whereas the incoming traffic is handled by telephone operators. Each operator has an operator's position equipment OPR and a register REGP. For connection of an incoming trunk line FL to an operator's position OPR selectors FSA, FSB are found which are set by a marker OM.

A particular bypass road *t* is arranged between the line equipments FDR and the operator's switchboard for signalling. This bypass road is controlled by a relay chain KR. Furthermore there are connecting circuits FFR for inquiry calls. Upon a call from the subscriber's telephone A1 the line equipment LR1 is operated. An identifying means in the marker SLM registers the call after which SLM selects a free connecting circuit SNR and a free register REGL and connects the telephone A1 through selectors in the selector stages SLA, SLB, SLC to the selected connecting circuit SNR and through a register finder to the selected register REGL. The subscriber hears a dial tone and sends the number that is intended by the call, for example the number of the subscriber's telephone A2. The register REGL registers the called number and connects itself to the marker SLM. The number is transferred to the marker which in a manner known per se establishes a connection between the connecting circuit SNR and the telephone A2.

At outgoing calls one calls with the direction digit 0 and the calling subscriber's telephone A1 will be connected to an outgoing trunk line UL. When setting up the telephone connection the connecting circuit SNR will be released simultaneously with the register REGL and the marker SLM. The selector SLA that is connected to the calling subscriber A1 is selected hereby first from the marker through RS, SNR, SLC, SLB and for the new connection a new pair of selectors SLB, SLC will be used which connects SLA with UDR. During the following outgoing call the inquiry call may be connected from the subscriber's telephone A1. Hereby the line UL will be separated while the inquiry call is connected through the selectors FSA, FSB and a connecting circuit FFR which through RS may be connected to a register REGL. The inquiry call is set up as a local connection by means of selectors SLC, SLB, SLA for eample to the subscriber's telephone A2. The inquiry connection thus extends from A1, thorugh SLA, SLB, SLC, UDR, FSA, FSB, FFR, SLC, SLB, SLA to A2. If the inqury results in a transfer for the call, FFR will be connected to the marker SLM and circuits are closed from FFR through SLC and SLB for selection in SLM of that selector SLA which is connected to the subscriber's telephone A2, and through FSB, FSA, UDR (upon incoming calls FDR) for selection of that trunk line UL (FL) which is intended. The last mentioned selection circuit is suitably conducted through that signal channel *t* which is intended by the invention. A new connection is connected between A2 and UL (FL) after which FFR will be released.

Incoming calls through a line FL are connected through FDR, FSA, FSB to a free telephone operator OPR who answers the call and becomes informed about the subscriber's telephone, for example A1, to which the call is directed. By means of a signal sender, for example a key set, the operator will set her register REGP. After RGP has received the number of the telephone A1, it connects itself to the marker SLM. The trunk line FL is selected by means of a circuit from REGP through OPR, the signal channel *t* and FDR to the marker SLM and the marker SLM establishes a connection between A1 and F1 through the selector stages SLA, SLB, SLC. Hereafter REGP, SLM and *t* will be released after which the condition of the line equipment FDR is signalled from FDR, through the signal channel *t* to a lamp set in OPR. After the signal transmission of the signal channel *t* will be released.

Figure 2:
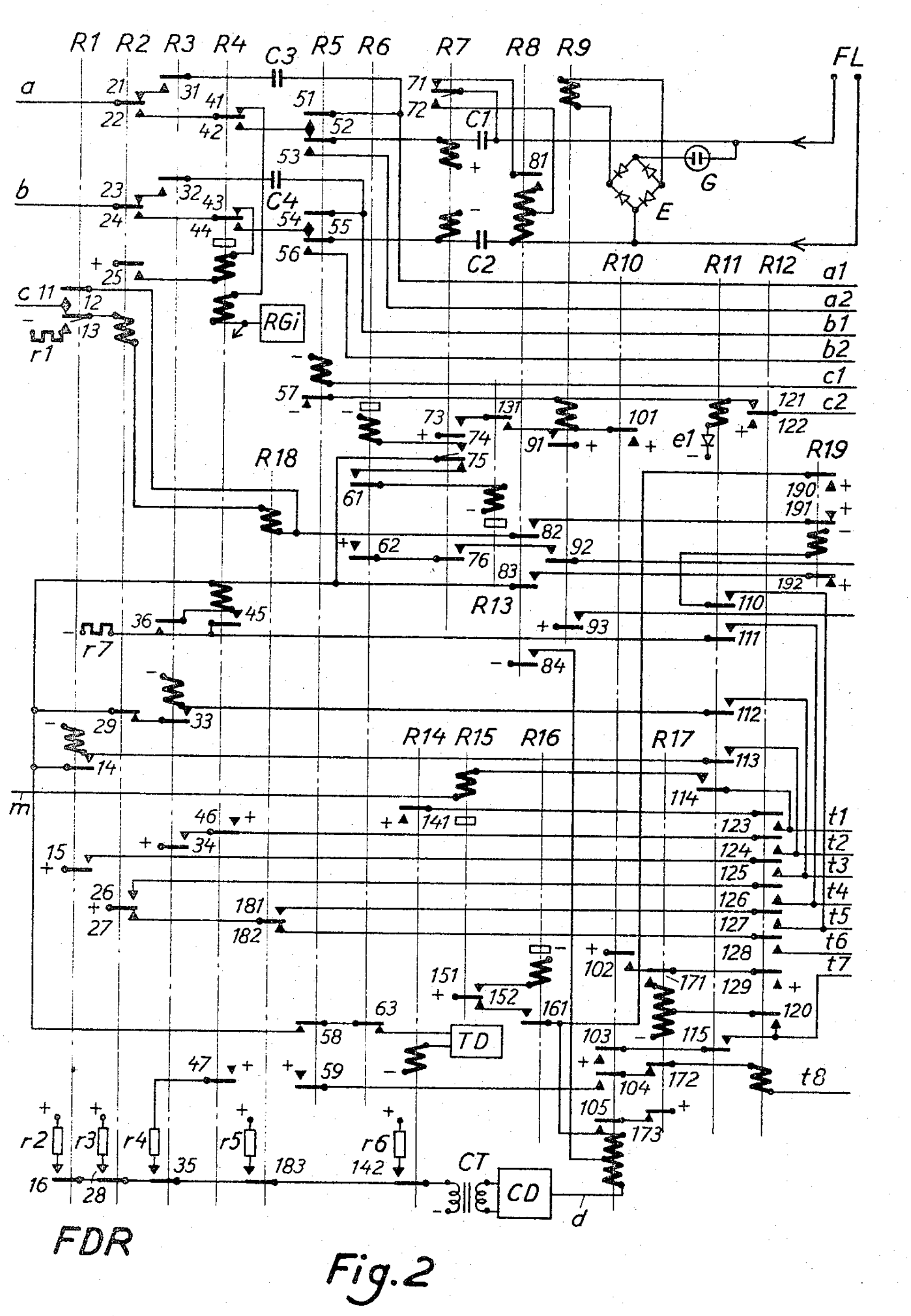
FIG. 2 shows a trunk line equipment.

In FIG. 2 are R1–R19 electromagnetic relays, G a glow discharge tube, E a rectifier bridge, TD a time arrangement and CD a monostable circuit and RG*i* an arrangement for the sending out of repeated ringing signals. The monostable circuit CD is connected to the secondary winding of a transformer CT and is activated at each change of current in the primary winding of CT, independently of the current direction in the secondary winding, so that a positive pulse is sent to the wire *d*. C1 and C4 are capacitors.

The time arrangement TD is restored to its initial position each time the current to the same is interrupted and will be started again when the current is connected. If the current lasts a certain time, the relay R14 will be energized by the time arrangement TD.

Figure 3:
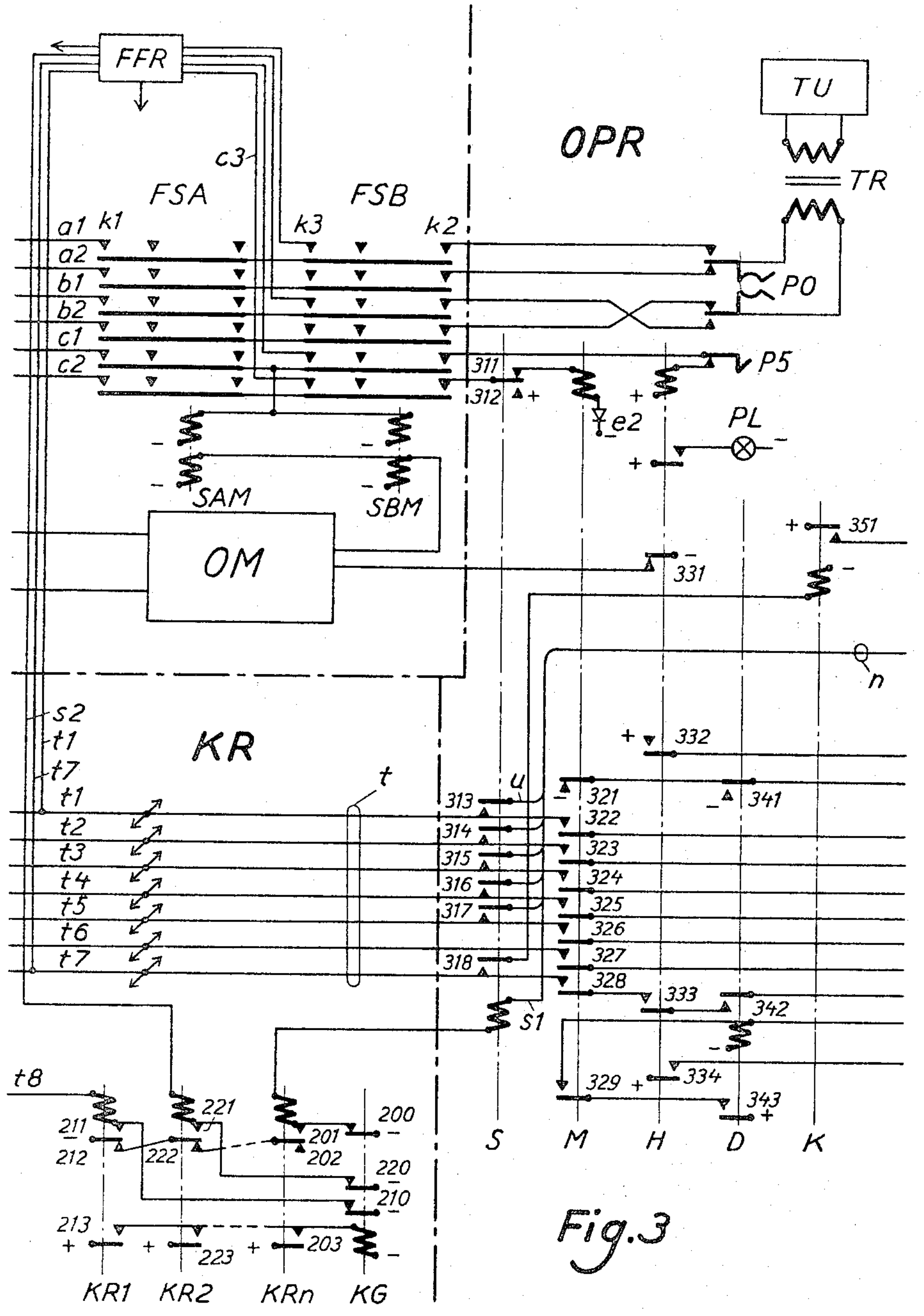
FIG. 3 shows a selecting means and a signal channel and part of the operator's position equipment.

In FIG. 3 is OM a marker, FFR a connecting circuit, TU an operator's speech device and S, M, H, D and K relays in the operator's position equipment OPR, PO is a key, P5 is a push button and PL a calling lamp. The figure also shows the signal channel *t* with seven signal wires *t*1–*t*7 and a relay chain KR1–KR*n*, KG made of electromagnetic relays.

Figure 4:
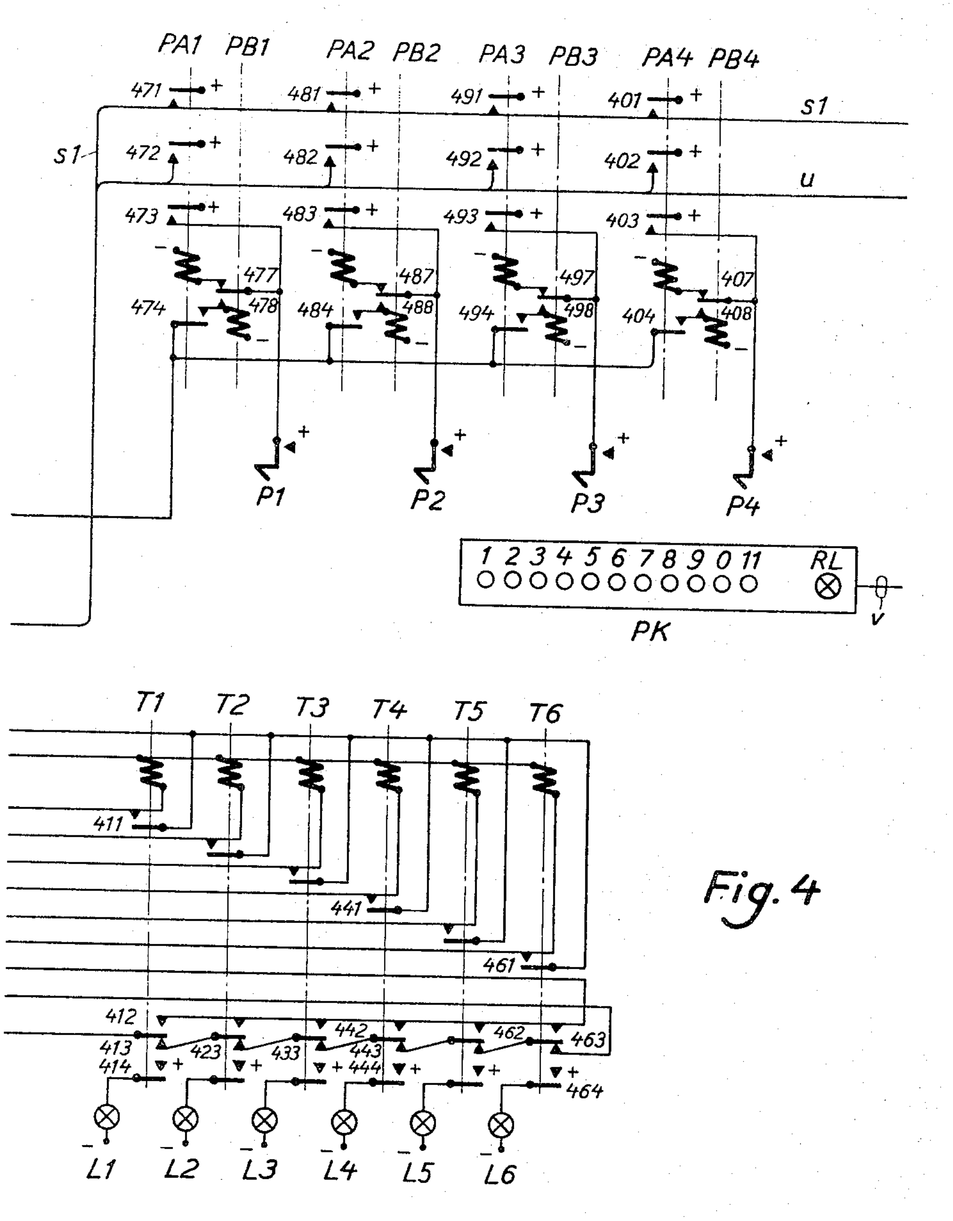
FIG. 4 shows sending and receiving means in the operator's position.

In FIG. 4 is shown a key set PK for the setting of a register through a bundle of wires *v*, push buttons P1–P4 and relays PA1–PA4, PB1–PB4 for signal sending, and lamps L1–L6 with relays T1–T6 for signal receiving.

FIG. 2 shows an embodiment for an incoming trunk line FL which connects a PBX-exchange with a conventional automatic telephone exchange. The trunk line FL is connected as a common subscriber's line, and for that reason a call is started with a ringing signal. Hereby the glow discharge tube G will be ignited. The ringing current is rectified in the rectifier bridge E and a direct voltage is supplied to the upper winding of the relay R9 which attracts its armature. The contacts 91–93 are actuated and R9 is held in operated condition in a circuit through its lower winding and the contacts 91 and 57. The contact 93 closes a circuit to the marker OM that identifies the calling line, selects a free operator's position OPR and connects the line FL to the same. The operator is marked idle respectively busy by means of a break contact 331 in FIG. 3.

Here it is presupposed that the operating magnets SAM and SBM of the selectors FSA and FSB in FIG. 3 are selected in the marker OM and attract with current through their lower windings. The contact spring assemblies *k*1 and *k*2 are actuated, after which the magnets SAM and SBM are held with current through their upper windings in series with the winding of the relay H. The contacts 331–334 are actuated. Simultaneously the relay R5 will attract in a circuit through the wire *c*1, FSA, FSB, the push button P5 and the winding of the relay H. The contacts 51–59 are actuated. The contact 57 breaks the current of relay R9 which releases its armature. The marker OM is released. The relay R7 attracts in the following circuit: +, the upper winding of R7, contact 53, wire *a*2, FSA, FSB, the key PO, the lower winding of the transformer TR, PO, FSB, FSA, wire *b*2, contact 56, the lower winding of R7, to negative. The contacts 71–76 are actuated. The contact 72 closes a circuit through the line FL and the lower winding of relay R8, whereby the ringing from the public telephone exchange is interrupted. The relay R8 attracts. The contacts 81–84 are actuated. The relay R6 that is slow-releasing attracts in a circuit through the contacts 192, 83 and 74. The contacts 61–63 are actuated.

In the operator's position equipment the relay D will attract in the following circuit: +, contacts 334, 413 . . . 463, the winding of relay D to negative. The contacts 341–343 are actuated. The operator has speech connection with the line FL through the capacitors C1 and C2, the contacts 53, 56, the wires *a*2, *b*2, the contact spring assemblies *k*1, *k*2, the key PO and the transformer TR and through its speech equipment TU. The calling lamp PL glows.

After the operator has obtained information about the called subscriber, she will dial the number of the same, for example the number of the subscriber's telephone A1 of the key set PK in FIG. 4, the register REGP being set. The key set PK contains digit buttons1–0 and a restoring button 11 and a signal lamp RL which shows that the register is in function. After the register REGP has connected itself to the marker SLM, transferred the called number to the same and the marker is ready to connect a communication, + potential will be connected to the wires *s*1 and *u* from the register. If the signal channel *t* is free, the following circuit will be closed: +, the wire *s*1, the bundle of wires *n*, the winding of relay S, the winding of relay KR*n*, the contact 200, to negative. The relay KR*n* attracts. The contacts 201–203 are actuated. The relay KG attracts. The contacts 200, 210, 220 and others are actuated. The relay KR*n* is held with current through the contacts 212, 222 . . . 201. The relay S attracts and the contacts 311–318 are actuated. The relay R11 attracts in the following circuit: +, contact 312, the selectors FSB, FSA, the wire *c*2, the contact 121, the winding of the relay R11, the rectifier *e*1, to negative. The contacts 110–115 are actuated. The position of the calling trunk line in the multiple of the selectors SLC is selected through the following circuit: +, wire *u*, contact 313, wire *t*1, contact 114, the winding of relay R15 which is slow-releasing, the wire *m*, to an indicating means, for example a selecting magnet of a crossbar switch, in SLC. The relay R15 attracts. The contacts 151–152 are actuated. The relay R16 attracts. The contacts 161 are actuated. When the marker has established the connection, the register will be released and the marker and + are disconnected from the wires S1 and U. The relays S, KR*n*, KG, R11 and R15 release their armatures. The signal channel *t* is released. During the release time of the relay R15 the condition of the line of the called subscriber, through a circuit from +, the contacts 191, 82, the windings of the relays R18 and R2, the contact 12, the wire *c*, the selector stages SLC, SLB, SLA to the cut-off relay in the subscriber's line equipment LR1 of the called subscriber's telephone A1 in FIG. 1. The following cases may occur:

(a) The subscriber's line is free. Both relays R2 and R18 attract. The contacts 21–29 and 181–183 are actuated.

(b) The subscriber's line is busy by a local call. Only the relay R18 attracts. The contacts 181–183 are actuated.

(c) The subscriber's line is busy by a trunk call. None of the relays R2 and R18 attracts.

When the relay R15 releases, the relay R10 will be operated during the release time of the relay R16 through the following circuit: +, the contacts 152 and 161, the upper winding of relay R10, the contact 84, to negative. The relay R10 is held with current through its upper winding and the contacts 105 and 173. The contacts 101–105 are actuated. If the signal channel *t* this free, the following circuit circuit will be completed: +, the contacts 59, 104 and 172, the winding of the relay R12, the wire *t*8, the winding of the relay KR1, the contracts 210, to negative. The relays R12 and KR1 attracts. The contacts 120–129 and 211–213 are actuated. The relay KG operates the contacts 200–220. The relays R12 and KR1 are held with current through the contacts 211. The relay M is operated in the following circuit: +, the contact 122, the wire *c*2, FSA, FSB, the contact 311, the winding of the rely M, the rectifier *e*2, to negative.

Signals are now transmitted from the equipment FDR of the trunk line FL to the relays T1–T6 in the operator's position OPR whereby the condition in FDR is indicated.

(a) The called subscriber's line was free: +, the contacts 26 and 126, the wire *t*4, the contact 325, the winding of the relay T4, the contact 341, to negative. The contacts 441–444 are actuated. The lamp L4 is ignited. The relay T4 is held in a circuit through the contacts 332, 441 and 341. The relay D is held in a circuit through the contacts 343 and 329. The following circuit is completed: +, the contact 334, the contacts 413, 423, 433, 442, 342, 333, 328, the wire *t*7, the contact 120, the lower winding of the relay R17, to negative. The relay R17 attracts and the contacts 171–173, are actuated. The relays R10, R12, KR1, KG, M and D release, while T4 is held and the lamp L4 remains ignited and marks that the called subscriber's line is free. The relay R17 is held by the contacts 129, 102 and 171 until R10 and R12 have been released, after which R17 will release its armature.

In this case the operator is supposed to disconnect the call by pressing the button P5. The relays H and R5 release their armatures. Intermittent ringing signals are sent out from RG*i* through the intermediate winding of R4, the contacts 41 and 22, the *a*-wire through SLC, SLB, SLA, the called subscriber's telephone A1, SLA, SLB, SLC, the *b*-wire, the contacts 24 and 43, the upper winding of the relay R4, the contact 25 to + or earth potential. The relay R4 is slow-operating and is not operated by ringing current. The time arrangement TD is started with current through the contacts 192, 83, 58, 63. When the called subscriber answers, R4 will attract. The contacts 41–45 are actuated and R4 is held with current through its lower winding, the resistance *r7*, and the contacts 45, 83 and 192. The relays R7 and R6 attract.

If the call is not answered within a certain time, the relay R14 will be operated by the time arrangement TD. The contacts 141–142 are actuated. A current increase in the primary winding of the transformer CT will arise when the resistance *r6* is connected by the contact 142. The relay R10 attracts. The contacts 101–105 are actuated. The relay R9 receives current through the contacts 101 and 57 and attracts. The marker OM is called by the contact 93 and establishes a connection to a telephone operator as has been described above. The relays R5, R12, KR1, KG, T1 and T4 attracts. The lamps PL, L1 and L4 are ignited. The relay R17 releases the signal channel. The operator informs that the subscriber does not answer.

(b) If the called subscriber was busy by a local call, not T4 but T5 will be operated in a circuit through the contacts 27, 181, 127, *t5*, 326, the winding of T5, the contact 341, to negative. The lamp L5 is ignited.

(c) When the called subscriber was busy by a trunk call, the relay T6 will be operated in a circuit through the contacts 27, 182, 128, *t6*, 327, the winding of T6, the contact 341, to negative. The lamp L6 is ignited.

Here it is presupposed that the called subscriber's line was busy by a local call and that the incoming call is a trunk call. The operator presses the non-locking push button P2 and operates the key PO. The relays R7 and R6 release. The relay R8 is held with current from the line FL through the contacts 71 and 81 and through its upper and lower winding connected in series. The upper winding of R8 has a high resistance whereby a signal to the public telephone exchange will be sent. This signal is non-essential to the invention. In the operator's position equipment the relay PA2 will attract. The contacts 481–484 are actuated after which PA2 will be held by the contacts 483 and 487. Through the wire S1 and the contacts 481 the relays S and R*n* will be operated, and then KG and R11 will attract. The relay R3 attracts in the following circuit: +, the contacts 482, 315, *t3*, 112, the winding of R3, to negative. The contacts 31–36 are actuated. Then R3 will be held with current through the contacts 192, 83, 29 and 33. Relay R4 attracts when the contact 36 closes. The contacts 41–47 are actuated.

When the contacts 35 and 47 close, a current will be received through the resistance *r4* and the transformer CT, which causes a circuit through the wire *d*, the lower winding of relay R10 and the contact 84. The relay R10 attracts and is held with current through its upper winding and the contacts 105, 173.

The following circuit is completed: +, the contacts 103, 115, the wire *t7*, the contact 317, the winding of relay K, to negative. The relay K attracts. The contact 351 closes. The relay PB2 receives current through the contacts 351 and 484 and attracts. The contacts 487–488 are actuated. The relays PA2, S and R11 release and PB2 is held until the push-button P2 is released. The operation of R10 causes that the relays R12, KR1, KG and M attract as has been described above. The relay D is now released, and therefore the contact 321 interrupts the current of relay T5 and the lamp L5 will go out. The relay D attracts. The relay T2 now attracts in the following circuit: +, the contacts 34 and 124, the wire *t2*, the contact 323, the winding of relay T2, the contact 341, to negative. The lamp L2 is ignited. The relay R17 attracts so that the signal channel is released and the relays M and D release as has been described above.

The telephone operator has now speech connection with the called subscriber through the capacitors C3, C4 and offers the trunk call. Three cases are presupposed:

(1) The trunk call shall be connected immediately. The operator presses the button P1. The relay PA1 attracts and the contacts 471–474 are actuated. PA1 is held with current through the contacts 473 and 477. The following circuits are completed: +, 471, *s1*, the windings of the relays S and KR*n*, which relays attract besides R11, and +, 472, 314, the wire *t2*, the contact 113, the winding of the relay R1, to negative. The relay R1 attracts. The contacts 11–16 are actuated. The relays R2 and R18 attract in a circuit through the resistance *r1* and the contacts 13, 82 and 191, whereby the earlier local connection is disconnected and the new connection is marked as a trunk call. The relay R1 is held with current through the contact 14. The relay R4 is kept operated in the following circuit: +, the contacts 192, 83, the lower winding of R4, the contact 45, the resistance *r7*, to negative. The relay R3 releases when the contact 29 is actuated. The operator has speech connection with the called subscriber through the contacts 22, 24, 42, 44, 51, 54 and the wires *a1*, *b1*.

When the contacts 16, 28 and 183 closes, a current change in the transformer CT will be obtained, so that the monostable circuit CD is activated and sends an impulse through the dire *d* and the lower winding of the relay R10 which attracts. The contacts 101–105 are actuated. The signal channel is occupied due to the attraction of the relays R12, KR1, KG and M. The relay T2 releases. The relays D, T3 and T4 attract. The lamps L3 and L4 are ignited. The relay R17 attracts and the signal channel is released. The telephone operator presses the button P5. The relays H and R5 release. The operating magnets SAM and SBM release. The relays R7 and R6 attract. A trunk connection is now established between the trunk line CL and the called subscriber by means of selectors SLA, SLB, SLC, the talking wires *a*, *b*, the contacts 22, 24, 42, 44, 52, 55 and the capacitors C1–C2.

(2) The call is suspended. The operator presses the button P5 and disconnects the telephone connection. The relays R5, R6, R7 and H release. The operating magnets SAM, SBM release. The relay R8 is held from the line FL. The relays R3 and R4 are operated. When the called line becomes free, R2 and R4 will attract. The contact 29 interrupts the current of R3 that releases its armature. By means of the contacts 28 and 183, CD and R10 and R9 will be operated. An operator is connected. The relays R5 and H attract and the lamps L2 and L4 are ignited which shows that the call is a trunk call and waits for an answer. The key PO is operated. The push button P1 is pressed. The relay PA1 attracts. The signal channel is occupied, the relay R1 attracts and the signal channel is released again as has been described above. The contact 16 closes, R10 attracts, the signal channel is occupied again, the lamps L2, L3 and L4 are ignited. If answer is obtained immediately from the called subscriber, the operator will press the button P5 and will be disconnected from the connection. If answer is not obtained, the operator will press the ringing button P3. The relay PA3 attracts. The contacts 491–494 are actuated. The signal channel is occupied by means of the contact 491. After the relays S and R11 have attracted, the following circuit will be completed: +, the contacts 492, the wire *t4*, the contact 111, to the resistance *r7*. The relay R4 is short-circuited and releases its armature. Repeated ringing signals are sent out from RG*i*. The relays R7 and R6 attract when the operator is connected and therefore the time arrangement TD has been restored. The telephone operator can disconnect the call immediately by pressing the button P5 or wait for an answer before she disconnects the connection.

(3) The called subscriber wishes to be connected to another subscriber within the exchange. The operator presses the button P4. The relay PA4 attracts. The contacts 401–404 are actuated. By closure of the contact 401 the signal channel *t* will be occupied. After the relays S and R11 have attracted, the following circuit will be completed: +, contact 402, contact 317, wire *t5*, contact 110, the winding of relay R19, to negative. The contacts 190, 191 and 192 are actuated. The circuit through the wire *c* is interrupted, whereby the connected communication will be broken. Those of the relays R1, R3, R4 which possibly have attracted, release their armatures. The relay R10 attracts in the following circuit: +, contact 190, the upper winding of R10, contact 84, to negative. The contacts 101–105 are actuated. A circuit is closed from +, contact 103, 115, wire *t7*, contact 318, through the winding of the relay K. The contact 351 is closed. The relay PB4 attracts in a circuit through the contacts 351 and 404. The contacts 407–408 are actuated. The relay PB4 is held by the contact 408 until the push button P4 is released and the relay PA4 releases its armature. The relays S, R11 and R19 release. The signal channel is released but is occupied again by the circuit from +, the contacts 59, 104, 172, the winding of R12, the wire *t8*, the winding of relay KR1, the contact 210, to negative. The relays R12 and M attract: the circuit from +, the contacts 27, 182, 128, the wire *t6*, the contact 327, the winding of the relay T6, the contact 341, to negative, will be completed. The relay T6 attracts and the lamp L6 is ignited. The original calling condition has been obtained and the operator dials the new subscriber's number on her key set PK. A new connection will be connected.

After an incoming telephone connection has been established, the called subscriber may connect an inquiry call. This occurs independent of the operator. The called subscriber sends an impulse, for example by means of his dial. The relay R7 releases and attracts again. The relay R6 that is slow-operating is not concerned. The relay R13 attracts and is maintained energized for a short while. The relay R9 attracts with current through the contacts 73, 131 and 57 and is then held by means of the contact 91. The marker OM is called by the contact 93 as has been described above. Simultaneously is signalled to OM through a circuit +, the contacts 62, 76, 92 and an inquiry call is intended. A pair of selectors FSA and FSB is selected by OM and the contact spring assemblies *k*1 and *k*3 are indicated. The operating magnets SAM and SBM are operated. The contact spring assemblies *k*1 and *k*3 are actuated so that a connecting circuit FFR for inquiry calls is connected to the line equipment FDR. The relay R5 attracts. The subscriber that effects the inquiry call is connected to FF3 through the contacts 22, 24, 42, 44, 51, 54, the wires *a*1, *b*1 and the contact spring assemblies *k*1, *k*3. Signals may now be sent from FFR to FDR by occuping the signal channel by means of the relay KR2 and the wire S2. Here only a signal that intends marking of FDR at a transfer of the call is presupposed. This signal is sent through the wire *t1*, the contact 114, the winding of the relay R15 and the wire *m*. The signal channel is released by a return signal through the wire *t7*, a new occupation of the signal channel whereby R12 and KR1 will attract, and final releasing of the signal channel by operation of R17 as has been described above.

We claim:

1. A circuit arrangement for a private automatic branch exchange with trunk lines and at least one manual operator's position, for transmitting signals between the line equipment of a trunk line and said operator's position, comprising a selecting means for connection of at least two talking wires between said line equipment and an operator's position, comprising a multiwire signal channel and a relay chain which comprises a relay means for each trunk line equipment and a relay means for each operator's position within the private branch exchange and in which only one relay means at a time may be operated, contact means which are actuated by said relay means and connect the wires of the signal channel to a signal sending means in the equipment corresponding to the operated relay means, a connecting relay in each line equipment and a connecting relay in each operator's position, provided with contacts which connect the wires of the signal channel to a signal receiving means belonging to respective equipment, and said connecting relay in one of the two equipments connected together by means of the selecting means is operated in a circuit through one of the wires of the selecting means when the relay means of the other equipment is operated and occupies the signal channel.

2. A circuit arrangement according to claim 1, comprising a restoring relay in each line equipment and each operator's position, a circuit for said restoring relay containing one of the wires of the signal channel, which circuit is closed by the signal receiving equipment when a signal is received whereby the restoring relay of the signal sending equipment will be operated and releases the signal channel.

3. A circuit arrangement according to claim 1 comprising condition marking contacts in the line equipments of the trunk lines and registering means in each operator's position and circuits containing wires in the signal channel through which said registering means of an operator's position are set in conformity with the position of the condition marking contacts in the line equipment of a trunk line when said line equipment by means of the selecting means is connected to the operator's position.

4. In a private automatic branch exchange, trunk lines each having a line equipment and at least one manual operator's position having a position equipment, selecting means for connection of at least two speech conductors between any one of said line equipments and any one of said position equipments, a signal sending means and a signal receiving means in each of said line equipments and in each of said position equipments, a multiconductor signalling channel and a relay chain with one relay means for each of said trunk line equipments and one relay means for each of said position equipments, in which relay chain only one of said relay means at a time can operate, contact means operated by said relay means connecting the conductors of said signalling channel to the signal sending means in the equipment corresponding to an operated relay means, a connecting relay in each of said trunk line equipments and a connecting relay in each of said position equipments, contacts on said connecting relay connecting the conductors of said signalling channel to the signal receiving means belonging to the respective equipment, said connecting relay in one of two equipments connected by said selecting means being operated in a circuit through one of the conductors of the selecting means when the relay means of the other equipment operates and occupies the signalling channel.

References Cited

UNITED STATES PATENTS

| | | | |
|---|---|---|---|
| 3,170,042 | 2/1965 | Giroud et al. | 179—27.02 |
| 3,297,829 | 1/1967 | Germanton | 179—27.1 |

WILLIAM C. COOPER, *Primary Examiner.*

KATHLEEN H. CLAFFY, *Examiner.*

L. A. WRIGHT, *Assistant Examiner.*